W. E. MILLER.
SHAFT COUPLING.
APPLICATION FILED OCT. 14, 1914.
1,190,666.
Patented July 11, 1916.
2 SHEETS—SHEET 1.
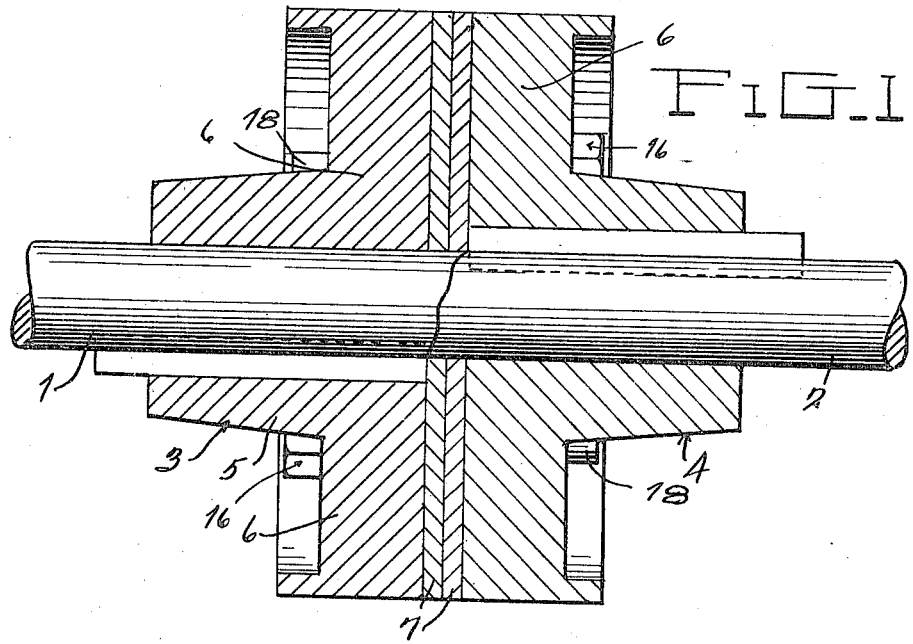
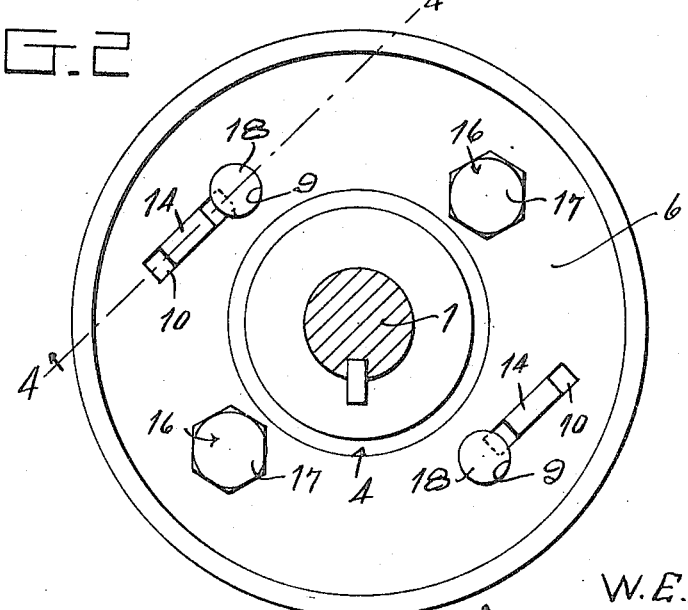
Witnesses
Chas. H. Trotter.
H. Kaye Martin
Inventor
W. E. Miller
By (signature)
Attorney W. E. MILLER.
SHAFT COUPLING.
APPLICATION FILED OCT. 14, 1914.
1,190,666.
Patented July 11, 1916.
2 SHEETS—SHEET 2.
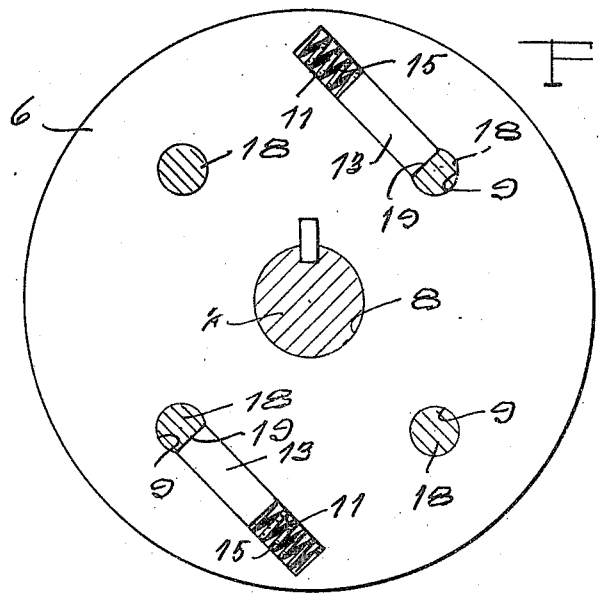
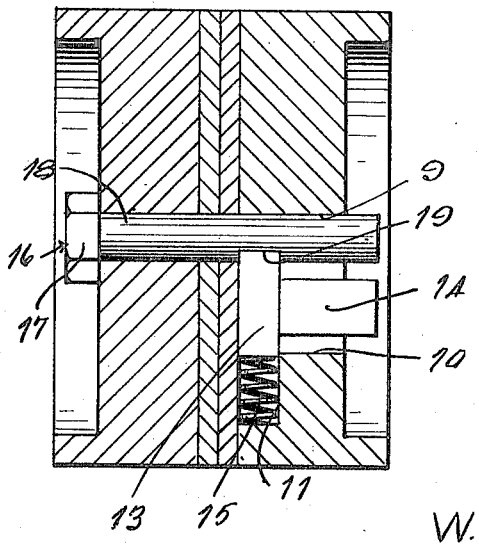
Witnesses
Chas. H. Trotter
Inventor
W. E. Miller
By
Attorney

UNITED STATES PATENT OFFICE.

WALTER E. MILLER, OF GOSHEN, INDIANA.

SHAFT-COUPLING.

1,190,666.  Specification of Letters Patent.  Patented July 11, 1916.

Application filed October 14, 1914.  Serial No. 866,631.

*To all whom it may concern:*

Be it known that I, WALTER E. MILLER, a citizen of the United States, residing at Goshen, in the county of Elkhart and State of Indiana, have invented certain new and useful Improvements in Shaft-Couplings; and I do hereby declare the following to be a full, clear, and exact description of the invention, such as will enable others skilled in the art to which it appertains to make and use the same.

This invention relates to new and useful improvements in shaft couplings, and has for its principal object to provide a coupling which will permit a shaft to be easily and quickly repaired in case of breakage.

Another object of the invention is to provide a means for quickly detaching a driven shaft from a drive shaft in order that the same may be given any necessary attention.

Still another object of the invention is to eliminate the use of screwthreaded bolts in connecting the flanges of the shaft couplings.

With these and other objects in view, the invention consists in the novel combination and arrangement of parts which will be fully set forth in the following specification and accompanying drawings, in which, Figure 1 is a transverse sectional view of a coupler constructed in accordance with this invention, Fig. 2 is an end view in elevation thereof, Fig. 3 is a face view of one of the abutting flanges, and, Fig. 4 is a detail sectional view taken on line 4—4 of Fig. 2.

Referring now to the drawing by characters of reference, the numeral 1 designates the drive shaft, while the numeral 2 designates the shaft which is to be driven.

Secured to the drive shaft 1 is the coupler half designated generally by the numeral 3, which is arranged to coöperate with a similar coupler half designated generally by the numeral 4, which is secured to the driven shaft. Each of these coupler halves comprises the hub 5 having formed thereon the flange 6. The faces of each of these flanges are smoothed off in the usual way and are arranged to abut each other when the device is in use. Suitable cover plates designated by the numeral 7 are provided and these plates are arranged to be placed between the adjacent faces of the flanges 6 to provide retainers for the bolt-locking means, which will be more fully hereinafter described.

Each of these flanges 6 is provided with a central aperture 8 which extends entirely through the hub and is arranged to receive the shaft and this flange is also provided with a plurality of apertures 9, through which the coupling bolts extend. A suitable recess 11 is formed in the adjacent face of each of the flanges and this recess is arranged to communicate with the bolt-receiving aperture 9 formed therein. In each plate there are two recesses which are arranged so that they communicate with diametrically opposite apertures as shown in Fig. 3. A suitable slot 10 is also formed in the flange in direct alinement with each of the recesses and the inner ends of these slots are arranged to communicate therewith.

Slidable in the recesses 11 is the latch member 13 which latch member is provided with the angular extension 14, which extension projects through the slot 10 and beyond the limits of the flange 6 to form a gripping element by means of which the latch member may be operated. A suitable coil spring 15 is seated in the recess 11 and is arranged to exert pressure against the latch member 13 to normally force the same toward the aperture 9 so as to engage the bolt when the same passes through the aperture. The bolt hereinbefore referred to is designated generally by the numeral 16 and comprises the head 17 having formed thereon the shank 18, which shank is provided near the end opposite the head with the recess 19, in which the end of the latch member is arranged to rest.

It will be apparent from the foregoing that in use the flanges are secured to the respective shafts by keys or in any other suitable manner and the adjacent faces of the flanges are then brought toward each other until the plates 7 engage each other. The bolts 16 are then passed through their respective apertures 9 and when they are in their proper position it will be apparent that the latch member 13 will be forced outwardly so as to engage within the notch 19 in the shank of the bolt and hold said bolt against movement. Should it be desired to release the shaft, the gripping element 14 of each of the latch members is pulled backwardly against the force of the spring 11 and it will thus be seen that the end of the latch member opposite the spring will be drawn from its position within the notch in the bolt 18 and permit said bolt to be removed, thereby releasing the flanges and permitting the shafts to rotate independently of each other.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A coupling comprising a pair of companion coupling members having passages therein for the reception of the opposed ends of abutting shafts and alined transverse openings opening into the forward and rear sides of the coupling members, one of said coupling members having a transverse recess therein opening into the rear side of the coupling member and into the transverse opening in the coupling member, the forward face of the mentioned coupling member having a recess therein extending at right angles to the first-mentioned recess and the transverse opening and having one end thereof communicating with the first-mentioned recess and the transverse opening, a plate mounted on the said forward face of the coupling member and closing the recess in the forward face and having an opening therein registering with the transverse opening in the coupling member, a spring pressed latch operable in the recess in the forward face of the coupling member and extending into the transverse opening, a manipulating member carried by the latch and extending through the transverse recess in the coupling member and a bolt extending through the alined transverse openings in the coupling members and the plate and having a notch therein for the reception of the latch so as to prevent displacement of the bolt.

In testimony whereof I affix my signature in presence of two witnesses.

WALTER E. MILLER.

Witnesses:
 IRA D. MILLER,
 DAVID B. HUGHES.

Copies of this patent may be obtained for five cents each, by addressing the "Commissioner of Patents, Washington, D. C."